Dec. 13, 1932.                L. SMITH                1,891,066
                             LAWN TRIMMER
                          Filed Dec. 14, 1931
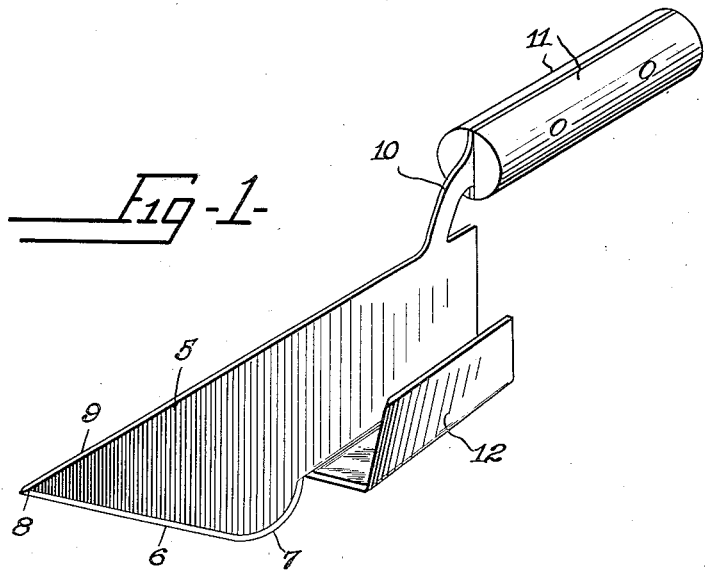
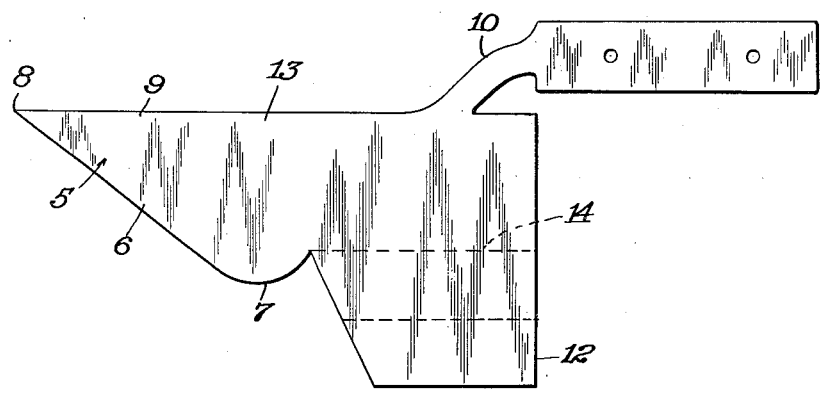
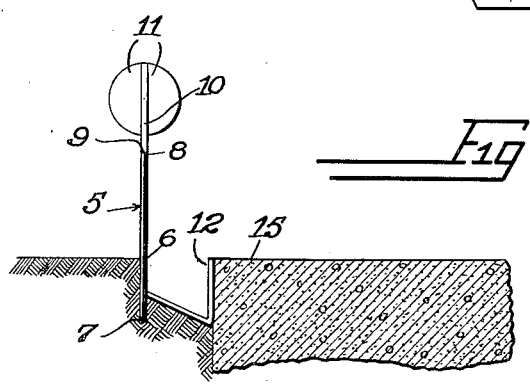
Lloyd Smith
            INVENTOR
BY *Victor J. Evans & Co.*
                ATTORNEY Patented Dec. 13, 1932

1,891,066

UNITED STATES PATENT OFFICE

LLOYD SMITH, OF PARIS, TENNESSEE

LAWN TRIMMER

Application filed December 14, 1931. Serial No. 580,998.

The invention relates to an implement, more especially to a lawn trimmer or grass cutter.

The primary object of the invention is the provision of an implement of this character wherein the blade thereof is of such design or construction as to enable the cutting with trueness or evenness the edges of lawns contiguous to sidewalks, curbings or the like and the said implement being of a kind that it may be readily and easily handled.

Another object of the invention is the provision of an implement of this character wherein the blade of the same has a certain conformation distinctive in itself so as to enable grass trimming irrespective of irregularities in the soil or areas adjacent to walks, curbings, gutters or the like, the implement being manually operable to provide a handy implement for gardening purposes and such work executed with dispatch and with resultant neatness to both the edge of the lawn and the walk, curbing or the like next thereto.

A further object of the invention is the provision of an implement of this character which is extremely simple in construction, thoroughly reliable and efficient in its purpose, readily and easily manipulated, light but strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:—

Figure 1 is a perspective view of an implement constructed in accordance with the invention.

Figure 2 is a plan view of the blank from which the implement is made.

Figure 3 is an end elevation showing the implement in place between a walk and a lawn for the trimming of the latter.

Similar reference characters indicate corresponding parts throughout the several views in the drawing.

Referring to the drawing in detail, the implement in its entirety comprises a blade 5 which is flat throughout its extent and at one end is formed with a receding diagonally disposed cutting edge 6 merging into a rounded cutting heel 7 located intermediate of said blade, the cutting edge 6 meeting a point 8 as formed thereby and the top edge 9 of said blade.

At or near the end of the blade 5 remote from the point 8 is an upwardly and rearwardly extending arm 10 carrying grip pieces 11 riveted or otherwise fastened thereto and constituting a handle, the latter with that portion of the arm 10 between the grip pieces 11 being disposed parallel with the top edge 9 of the blade 5 and through the instrumentality of this handle the implement is operated.

Formed on the blade 5 immediately rearwardly of the heel 7 is a trough-like guide 12, the same with the blade and the arm 10 being cut from a single blank 13 while the guide 12 is folded on the fold lines 14 of this blank 13 to present the shape as shown in Figures 1 and 3 of the drawing.

In the use of the implement the cutting edge 6 is the leading edge of the blade 5 and serves to trim and cut both grass and soil of a lawn, the cut material being delivered rearwardly through the trough-like guide 12 which is disposed in guiding position against a walk 15, curbing or the like so that as the implement is pushed forward when in the position as shown in Figure 3 of the drawing the lawn edge will be truly trimmed and the severed material, both grass and soil, will flow rearwardly between the blade 5 and the upstanding portion of the trough-like guide 12 for the convenient removal of the loose material subsequent to the trimming of the edge of the lawn as will be apparent.

The cutting heel 7 protrudes perpendicularly below or beneath the lowermost portion of the guide 12 and will assure severance of flattened grass uncut by the lead edge 6 of said blade so that a thorough and complete trimming of the edge of the lawn is assured.

The trough-like guide 12 extends laterally from one side of the blade 5 of the implement as will be apparent.

While there has been shown and described the arm 10 integral with the blade 5 it is to be understood that such arm may be riveted or otherwise fastened to the blade.

What is claimed is:—

A lawn trimmer comprising a vertically disposed flat blade having its rear portion formed with a trough-like guide disposed at one side of said blade and extended laterally from the lower edge thereof, a forwardly inclined portion on the blade in advance of the trough, a rounded cutting heel between the inclined portion and the trough extending below the plane of the bottom of said trough-like guide, the inclined portion and heel presenting a continuous cutting edge, and a handle extended above the upper edge of the blade and rearwardly directed.

In testimony whereof I affix my signature.

LLOYD SMITH.